United States Patent [19]

Ebert, Jr.

[11] 4,238,691
[45] Dec. 9, 1980

[54] PHASE CONTROL ARRANGEMENT TO LIMIT OUTPUT SIGNAL TRANSIENTS DURING POWER SOURCE SUBSTITUTION IN AN UNINTERRUPTIBLE POWER SUPPLY

[75] Inventor: Harry K. Ebert, Jr., Hackettstown, N.J.

[73] Assignee: Bell Telephone Laboratories, Incorporated, Murray Hill, N.J.

[21] Appl. No.: 973,711

[22] Filed: Dec. 27, 1978

[51] Int. Cl.³ ............................................. H02J 9/06
[52] U.S. Cl. ........................................ 307/66; 307/87
[58] Field of Search ................... 307/64, 66, 87, 46, 307/127, 48, 23, 86; 363/41

[56] References Cited

U.S. PATENT DOCUMENTS

| | | | |
|---|---|---|---|
| 3,805,139 | 4/1974 | Hoffman, Jr. et al. | 307/66 X |
| 4,010,381 | 3/1977 | Fickenscher et al. | 307/66 |
| 4,148,097 | 4/1979 | Deisch | 363/49 X |

*Primary Examiner*—John Gonzales
*Assistant Examiner*—James L. Dwyer
*Attorney, Agent, or Firm*—Alfred G. Steinmetz

[57] ABSTRACT

A power supply load transfer system reduces the transients produced at a moment of transfer by reducing the first and second half-cycle durations of the reserve signal output following the moment of transfer by equal amounts so that a previous phase lag between a primary signal and the reserve signal is eliminated.

6 Claims, 2 Drawing Figures

4,238,691

PHASE CONTROL ARRANGEMENT TO LIMIT OUTPUT SIGNAL TRANSIENTS DURING POWER SOURCE SUBSTITUTION IN AN UNINTERRUPTIBLE POWER SUPPLY

TECHNICAL FIELD

This invention is concerned with the phase control of signal inputs and outputs in an uninterruptible power supply and it is more particularly concerned with a technique of transient signal suppression when switching from one power source to another.

BACKGROUND OF THE INVENTION

Modern uninterruptible power supplies frequently couple two power sources through a single transformer structure to supply uninterruptible power to a load to be energized. A primary power source, typically supplied by a commercial utility, customarily continuously supplies power to the output. A secondary or reserve power source is activated to supply power to the load only upon failure or degradation of the primary power source.

Power flow through a highly reactive transformer is a function of the phase angle between an input signal and the output signal. To achieve high efficiency, the reserve power source is continuously operated in an idling condition, that is, the inverter switches are timed to operate so that the output signal of the inverter is in phase with the output signal of the power supply. Hence during idling, no power flows from the reserve source to the output load. Upon failure of the primary source, the reserve power source responds immediately to supply power to the output load.

Since uninterruptible power supplies are frequently used to supply power to data processing type circuits, the reserve power source must act quickly to supply power whenever the primary power source experiences either a permanent or temporary failure in order to maintain the integrity of information in the data processing circuit.

During the transition period the output signal changes from being in phase with the inverter signal to a signal which lags the phase of the inverter signal. When this occurs, the output signal extends its period temporarily to achieve the desired phase lag and hence experiences a transient frequency change, sometimes called a frequency hit. Such frequency hits may destroy the integrity of information contained within the data processing circuit being powered.

SUMMARY OF THE INVENTION

Therefore, in an uninterruptible power supply embodying the principles of the invention, the relative phase angles of a signal generated by an inverter operating to invert a reserve DC power source and an output signal are controlled by a digital phase control circuit. The digital phase control circuit operates by generating a phase control number. This number is utilized to control logic circuitry which controls the timing of the switching devices in the inverter to provide the appropriate phase angle to the inverter signal so that no power flows from the inverter to the output load.

At the moment of transition when the inverter is called upon to deliver power to the output, the digital phase control operates to counter the above-described signal frequency transients or frequency hits by immediately temporarily altering the phase control number to reduce the half-cycle period of the inverter signal for two successive half-cycles so that the inverter signal is adjusted into a proper phase angle load with respect to the output signal and hence delivers power thereto. Hence, during this initial cycle of operation, the inverter is operated with two shortened but equal inverter half-cycles which permit the output signal to quickly lag the inverter signal with no frequency hits occurring. This assures that the initial output signal of the inverter in its failure mode supplies equal and opposite volt seconds to the magnetic core of the transformer, thereby eliminating saturation problems and optimally minimizing the signal frequency transients at the output since the output signal does not have to readjust its phase to properly lag the inverter signal phase.

DETAILED DESCRIPTION

Figure 1:
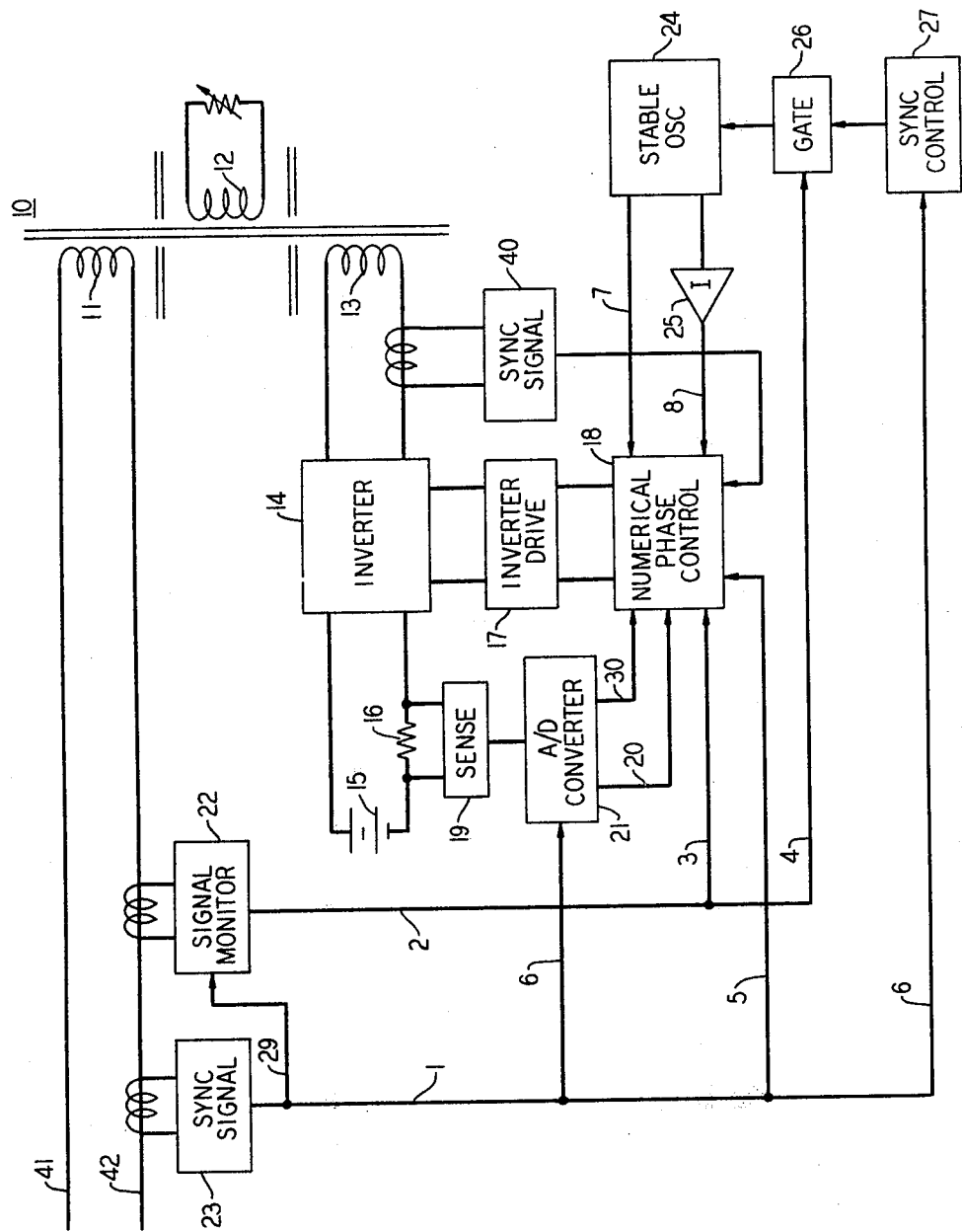
FIG. 1 is a block diagram of an uninterruptible power supply including a phase control embodying the principles of the invention.

The uninterruptible power supply shown in FIG. 1 discloses a transformer structure 10 having two input windings 11 and 13 and a single output winding 12. The transformer structure is designed so that the input windings 11 and 13 are effectively isolated from each other by magnetic shunts while permitting power to be supplied from input windings 11 and 13 either singly or in combination to the output winding 12. The primary power source, which is normally a power signal supplied by a utility, is coupled to input winding 11 via input leads 41 and 42. The reserve power signal applied to input winding 13 is derived from a DC voltage battery source 15 which is coupled to an inverter 14. Inverter 14 inverts the DC voltage and applies a periodic reserve power signal to the input winding 13.

Power flow from either input winding 11 or 13 is controlled by the respective phase angles between the signal at that winding and the signal at the output winding 12. For power to flow from an input winding to an output winding, the phase angle at the output winding must lag the phase angle of the signal at the input winding.

During normal operation the power signal applied to input winding 11 supplies all the power to the output winding 12. Since the reserve power source must supply power quickly upon failure of the primary power source, the inverter 14 is operated in what is known as an idling condition. That is, the inverter drive 17 supplies drive signals to the switching devices of the inverter 14 so that the signal phase angle of the periodic signal output of the inverter at input winding 13 is coincident in phase with the output load signal at the output winding 12. To assure that the inverter output signal is in phase with the output signal on winding 12, the output current of the battery source 15 is sensed by sensing the voltage drop across a small sensing resistor 16 connected in series between the main conduction path of the inverter switching devices and the battery 15. The sensing circuit 19 detects the voltage across resistor 16, amplifies it, and applies this amplified voltage to an analog-to-digital converter 21. The analog-to-digital converter 21 operates in a delta modulation mode and digitizes the voltage across sensing resistor 16 by generating up digits or down digits on leads 30 and 20, respectively, which are applied to a numerical phase control circuit 18.

The numerical phase control circuit 18 generates the timing signals which are applied to the inverter drive 17 to control periodic conducting intervals of the switching devices of the inverter 14. The primary power signal is monitored by a sync signal circuit 23 which applies timing signals via leads 1 and 5 to the numerical phase control 18 to provide synchronizing signals for the sequential operation of the logic circuits contained therein. It also applies a synchronizing signal via leads 1 and 6 to a synchronizing control 27, which is coupled via gate 26 to a stable oscillator 24 to permit it to operate in synchronism with the logic circuitry of the numerical phase control 18. The stable oscillator 24 generates a square wave on lead 7 which is applied to the numerical phase control 18 and, through the use of a polarity inverter 25, generates an oppositely phased square wave signal on lead 8, also applied to the numerical phase control 18.

The numerical phase control 18 includes circuitry to generate a digital control number which phase delays the square wave generated by the stable oscillator 24. This signal is phase delayed by the numerical phase control so that the drive signals generated by the inverter drive 17 permit the inverter to idle, drawing no current from the battery. In this idling condition, the periodic output signal of the inverter at input winding 13 is in phase coincidence with the output power signal on output winding 12.

A signal monitor circuit 22 monitors the amplitude condition of the primary power signal. The signal monitor circuit 22 is operated in response to a synchronizing signal from the sync signal control 23 applied via lead 29 so that its AC signal condition signals are synchronized with the operation of the converter 21 and the numerical phase control 18. During normal operation the signal monitor circuit 22 applies AC signal condition signals via leads 2 and 3 to the numerical phase control circuit 18 to assure that the numerical phase control operates in response to the output of the analog-to-digital converter 21 in operating to null current through resistor 16 when the AC signal is in a fully operative condition, namely, having substantially full amplitude.

Upon failure of the primary AC power signal the signal monitor applies a signal via leads 2 and 4 to disable gate 26 which allows stable oscillator 24 to operate independently of synchronizing signals. The numerical phase control circuit 18 includes operating features which permit the transition from the normal mode of operation to the failure mode of operation to occur in such a fashion as to minimize signal transients at the output due to the change. It operates, as described in detail below, to reduce by equal interval amounts the first two half-cycle durations of the periodic signal waveform output of the inverter 14 at the beginning of the failure mode of operation. It then allows the inverter output signal to return to its normal duration each cycle. By reducing the duration of the first cycle of the inverter output signal during the transition to a failure mode of operation, the frequency transients which might occur at the output are suppressed. By reducing the duration of the first two half-cycles equally, the volt seconds of the opposite polarity of the first two half-cycles to the input winding 13 are balanced so that they do not cause saturation of the transformer core.

Upon restoration of the primary AC power source to full amplitude, the signal monitor 22 sends a control signal to the numerical phase control 18 to permit it to again respond to the analog-to-digital converter 21 in order to null current flow through resistor 16 and the inverter 14 slowly shifts its output signal phase so that its output signal is coincident in phase with the power signal at output winding 12. Hence, it is again operating in the idling condition and supplies no power to the output of the power supply.

A second sync signal control 40 monitors the output signal of the inverter at input winding 13 and supplies further timing to the logic circuitry of the numerical phase control 18 in order to properly time the aforedescribed transition signal responses to the existing output signal of the inverter. The output of the synchronizing control 40 is utilized to synchronize the response of the transient phase shift operation during transition from normal to a failure mode of operation so that the reduction of the first two half-cycle durations is properly timed with respect to the preceding cycle of the output signal waveform of the inverter.

Figure 2:
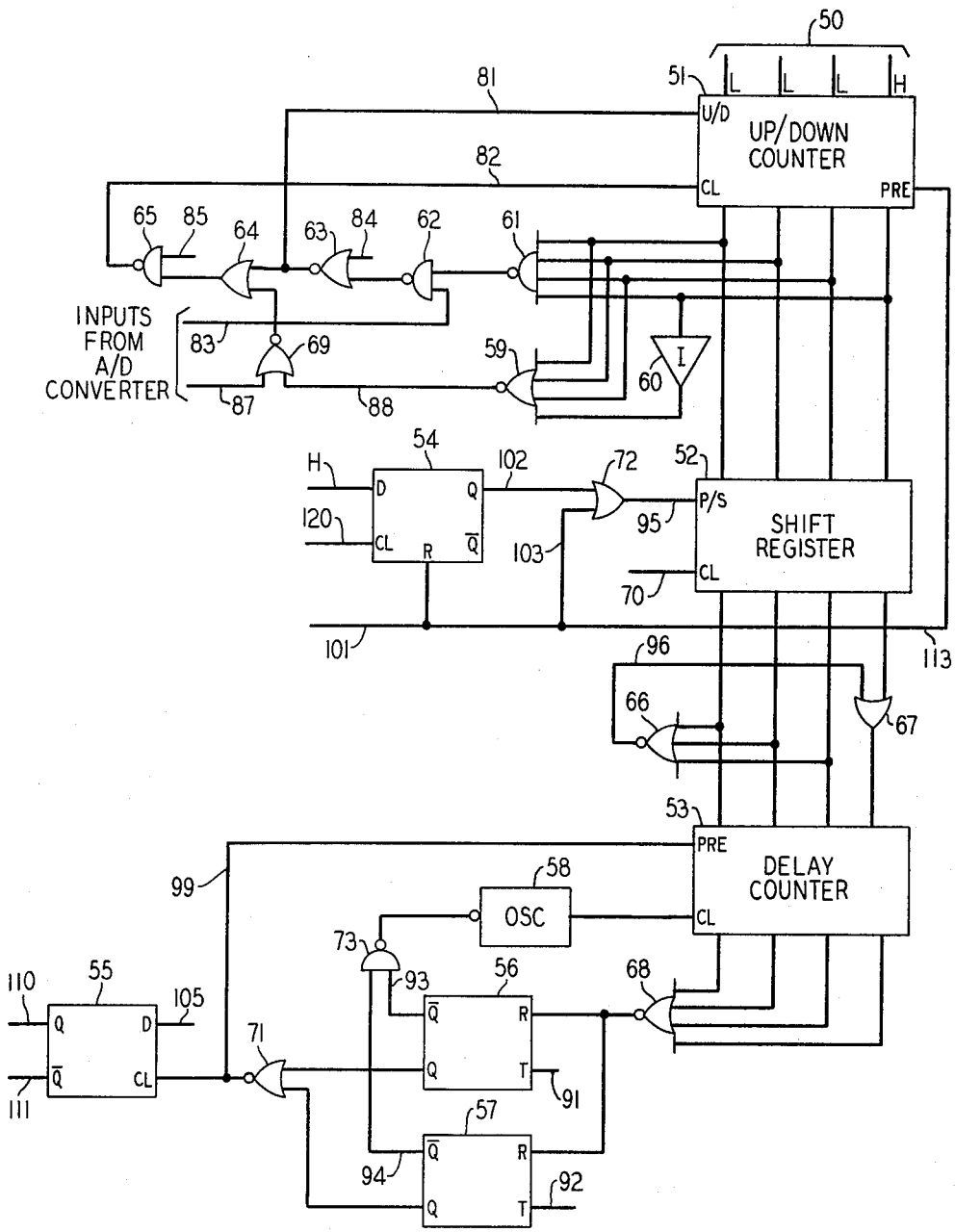
FIG. 2 is a logic diagram of a phase control arrangement used in FIG. 1 and embodying the principles of the invention.

A numerical phase control circuit suitable for use in the uninterruptible power supply disclosed in FIG. 1 is shown in a detailed logic diagram of FIG. 2. Its operation is digital utilizing a phase control number in binary form to control inverter drive signals to achieve a desired signal phase at the inverter output. In the illustrative embodiment this phase control number comprises four binary digits but it is to be understood that such numbers may comprise any desired number of digits. The phase control number is contained in an up-down counter 51 which has its up-down input responsive to the analog-to-digital converter output described above with respect to FIG. 1. In response to that converter output, it is clocked either up or down by a periodic signal supplied by the sync signal circuit 40 in FIG. 1 responsive to the inverter signal output. As described below, this binary number which represents the basic phase control number is applied to a shift register 52 which, during normal operation, operates in a parallel mode and transmits the same number unchanged to a delay counter 53. The output of the delay counter 53 is counted down in response to an oscillator 58 and the time interval it takes to completely count down the number in counter 53 determines the phase delay between the signal supplied by the stable oscillator 24 shown in FIG. 1 and the output signal of the inverter 14. The output drive signal which is supplied to the inverter drive is derived from a D-type flip-flop 55 at its normal and complementary outputs 110 and 111.

The numerical phase control, as shown in FIG. 2, includes several features to limit the maximum and minimum count. For example, the minimum count is limited to a 0001 count which is the initial preset count from which the operation starts, whereas the maximum count is limited to 1111. Features which control these limits will be described below.

The numerical phase control circuit may be best understood by describing its various modes of operation. During normal operation, the numerical phase control circuit operates to keep the inverter properly idling and, hence, is continuously responsive to the output of the analog-to-digital converter. The up and down binary signal outputs of the analog-to-digital converter are applied to input lends 83 and 87, respectively. A count is contained in the up-down counter 51. It may be an initial preset count which is shown at the counter preset inputs 50 which, in the illustrative embodiment, is the number 0001 or a subsequent number derived in response to the analog-to-digital converter.

Should the analog-to-digital converter supply an up digit signal to lead 83, it is coupled to a NAND gate 62. Another input to NAND gate 62 is derived from an output of NAND gate 61 whose inputs are all connected to the outputs of the up-down counter 51. The purpose of NAND gate 61 is to limit the maximum count of the counter by preventing it from recycling from a maximum count of 1111 to a subsequent count of 0000 in response to an up digit signal. It is apparent to those skilled in the art that at the maximum count 1111 the output of NAND gate 61 shows a zero or low state value which signal disables the subsequent NAND gate 62 and, hence, prevents the application of any subsequent up digit signals on lead 83 from being applied to the subsequent NOR gate 63 and recycling the count in counter 51.

Assuming that the count in up-down counter 51 is less than its maximum value 1111, the up digit signal on lead 83 is coupled to NOR gate 63. NOR gate 63 has an input on lead 84 from the signal monitor circuit, described above with reference to FIG. 1, indicating the state of the primary AC power signal. If this signal is low, indicating a normal primary power signal, the NOR gate 63 is permitted to transmit the up digit signal via lead 81 to the up-down input of the up-down counter 51. This up digit signal conditions the counter 51 to increase its count by one digit at its next clock pulse input. The output of NOR gate 63 is also applied via OR gate 64 to enable NAND gate 65 which transmits the clock pulse applied to lead 85 and supplied by the sync signal source at the inverter output described above.

A down digit signal generated by the analog-to-digital converter is applied to input lead 87 and coupled to NOR gate 69. As indicated above, logic circuitry is included to prevent the count of counter 51 from going below 0001 in response to a down digit signal. The output of counter 51 is coupled to a NAND gate 59 with the lowest order digit being connected thereto through a polarity inverter 60. Hence it is apparent that the output of NAND gate 59 is a high signal state when the count is 0001. This high signal state is inverted by NOR gate 69 and, as applied to NAND gate 65 via OR gate 64, disables transmission through NAND gate 65 and hence blocks application of the clock pulse on lead 85 to lead 82 connected to the clock input of counter 51.

If the count in counter 51 is greater than 0001, the output of NOR gate 59 on lead 88 is low. Hence the down digit which is a low signal state is transmitted and inverted by NOR gate 69 and, as applied to NAND gate 65 via OR gate 64, enables application of the clock pulse on lead 85 to lead 82 connected to the clock input of counter 51 to decrement the count contained therein.

The state of the signal on lead 81, whether it is an up signal or the absence of an up signal, controls the repsonse of the up-down counter as to whether it counts up or down in response to a subsequent clock pulse.

The clock pulse is derived from the sync circuit described above responsive to the signal output of the inverter circuit. This signal, applied on lead 85, is transmitted through an AND gate 65 enabled by the signal output of OR gate 64 and via lead 82 to the clocking input of the up-down counter 51. In response to this clocking input, the up-down counter 51 either ups or lowers its count, depending on the state of the signal applied to lead 81.

The resulting output count of up-down counter 51 is applied to a shift register 52. The state of the signal on lead 95 determines if the shift register is operating in a parallel or serial mode. This signal is derived as described herein below. Normally shift register 52 operates in its parallel mode and only during a transition from a normal to a failure mode of the power supply does it operate temporarily in the serial mode to shift the count digits to halve the phase delay number.

The shift register 52 is clocked by the pulse output on lead 70 supplied by the sync circuit monitoring the signal output of the inverter and transmits the count of counter 51 in its parallel transmission mode to a delay counter 53.

This count output of shift register 52 has three higher order digits applied to a NOR gate 66 with the output of the NOR gate 66 being in turn coupled to OR gate 67 which couples the lowest order digit output of the register 52 to the delay counter 53. It is apparent to those skilled in the art that if the smallest number which is to be applied to delay counter 53 is 0001, and if shift register 52 generates a 0000 count, the 000 input to the NOR gate 66 generates a ONE output at its output lead 96. This ONE is coupled to OR gate 67 and constrains the minimum number applied to the delay counter 53 to a value of 0001, hence limiting the minimum phase control number utilized in the phase shift control even during a change of power sources.

The output of the delay counter 53 is applied to a NOR gate 68. NOR gate 68 generates a low output state signal since at least one of its inputs is high. This low output state signal is applied to the reset inputs of two monostable multivibrators 56 and 57. With the reset inputs of the monostable multivibrators 56 and 57 low, the complementary outputs on leads 93 and 94 are in a high state which, when applied to NAND gate 73, are converted to a low state signal at the inhibit input of oscillator 58 permitting it to oscillate. Hence, oscillator 58 is allowed to run freely and counts down the count contained in the delay counter 53. As soon as the count in the delay counter 53 is fully decremented to 0000, the output of NOR gate 68 assumes a high state which, applied to the reset inputs of the monostable multivibrators 56 and 57, enables them to respond to trigger pulses. These trigger pulses are supplied on leads 91 and 92 by the stable oscillator shown in FIG. 1.

The square waveform of the stable oscillator shown in FIG. 1 is applied to input 92 of monostable multivibrator 57 and its complementary waveform described above is applied to the input lead 91 of the monostable multivibrator 56. These input leads 91 and 92 are connected to the trigger inputs of the monostable multivibrators 56 and 57. When the oscillator 58 has completely counted down the count in delay counter 53, it is apparent that the output of NOR gate 68 goes high, hence enabling the monostable multivibrators to respond to the input square waves at their input trigger leads 91 and 92. The two multivibrators 56 and 57 respond alternately to the complementary signal inputs to permit a countdown in adjacent half-cycles. In each case the signal on lead 93 or 94 goes low and the output of NAND gate 73 inhibits operation of oscillator 58. The Q output of either multivibrator 56 or 57 is now high and is applied to NOR gate 71. The low state output is applied to the clock input of a D-type flip-flop 55. The output of NOR gate 71 is also applied, via lead 99, to again reset delay counter 53 for a subsequent cycle of operation.

The output of NOR gate 71, applied to a clock input of D-type flip-flop 55, causes it to clock. The stable oscillator (FIG. 1) output signal is applied to the D input of flip-flop 55 on lead 105. Hence, in response to the clock signal output of NOR gate 71, the stable oscillator signal is delayed by the time interval required to count down the count in delay counter 53.

Two oppositely phased square-wave signals are generated at leads 110 and 111 and are delayed from the stable oscillator signal on lead 105 by an amount controlled by the count which originally appeared in the up-down counter 51. The output square-wave signals on leads 110 and 111 are applied to the inverter drive circuit shown in FIG. 1 and are used to drive the inverter switching device so that the output signal of the inverter is in phase with the output load signal of the power supply.

Should the primary power signal suddenly fail, the phase control circuit must respond promptly to shift the phase of the signal supplied by the inverter circuit to permit the power supply to provide a smooth transition between the primary power source and the reserve power source without introducing undesirable transients at the output of the power supply. In order to accomplish this objective, the phase control circuit must first be prevented from responding to the up and down digit control signals of the analog-to-digital converter on leads 83 and 87 which control the signal phase during the idling operation of the inverter. Hence an AC signal monitoring signal of the signal monitor in FIG. 1 is applied on lead 84 to disable the application of the up digit control signal states on lead 81 to the up-down counter 51 of the phase control circuit. This monitoring signal is also applied to lead 101 and operates to reset a D-type flip-flop 54. It is also applied subsequently, via lead 103, to OR gate 72, via lead 95 to the parallel serial control input of the shift register 52, and via lead 113 to the preset of counter 51. It immediately operates to put the shift register in its serial mode of operation and to preset counter 51 to a count of 0001. The shift register is clocked by the output of the sync control applied to lead 70 which is responsive to the signal output of the inverter and operates to shift the digits of the phase delay number contained therein one bit to the left thereby immediately reducing the numerical value to one-half its previous value and hence reduces the phase delay by one-half during the first half-cycle of the inverter output following a transition to a failure mode of operation.

The shift register 52 remains in the serial mode for only a short duration, just long enough to permit the clock pulse on lead 70 to shift the number one bit to the left. This effect is controlled by the duration of the monitoring signal on lead 101 and is short enough so that the D-type flip-flop 54 can respond to a sync signal responsive to termination of the first half-cycle output of the inverter.

As soon as the subsequent inverter synchronizing signal is applied to lead 120 at the clock input of the D-type flip-flop 54, it applies its clocked output on lead 102 via OR gate 72 and lead 95 to again put the shift register into its parallel mode of operation. This will cause the 0001, which now appears at the output of counter 51, to be transferred to the output of register 52.

The halved phase delay number and the 0001 are successively applied to the delay counter 53 and operate as described above to delay the inverter signal output relative to the output of the stable oscillator. It is readily apparent from the foregoing description that the first two successive half-cycles of the inverter output at the transition to a failure mode of operation are both equal and less than the normal duration of the square wave output of the inverter. The result of this control is that the inverter output is two short but equal half square waves providing the necessary equality of volt second inverter half-cycles and advantageously minimizing frequency transients at the output of the power supply.

I claim:

1. A power supply load transfer system wherein a reserve power source operates in an idling condition by phase lagging a primary power source characterized by:
   number storage means wherein a controllable number is stored, said number controlling the phase lag magnitude, and number reduction means reducing said number to a predetermined minimum value in two equally successive steps operative for reducing said phase lag, said successive steps thereby reducing equally the time intervals of a first and second half-cycle of a periodic signal output of the reserve power source following a moment of transfer of a load from the primary power source to the reserve power source.

2. A power supply load transfer system as defined in claim 1 and further characterized by said number storage means including a counter whereby a count in the counter establishes a phase lag magnitude and said number reduction means operative for reducing includes a shift register for reducing the count by shifting its digits equally during the first and second half-cycles following the moment of transfer.

3. A power supply load transfer system as defined in claim 2 and further characterized by means for responding to a failure of the primary power source to activate the shift register into a serial mode of operation and means for clocking a shift in the shift register in synchronism with the periodic signal output of the reserve power source.

4. A power supply system wherein a reserve power source operates in an idling condition by phase lagging a primary source,
   means for transferring a load from the primary power source to the reserve power source, and
   means for establishing a numerical count representative of a desired phase lag and means for reducing the count to a predetermined minimum count in two equally reduced successive steps in response to a transfer of a load from the primary power source to the reserve power source.

5. A power supply system as defined in claim 4 wherein said means for reducing includes a shift register and means for inducing a count shift in said shift register in synchronism with a periodic signal output of said reserve power source.

6. A power supply system as defined in claim 5 and further including means for limiting a minimum and maximum value of the numerical count and means for preventing a count output of the shift register from shifting below a value of one.

* * * * *